United States Patent
Dobashi et al.

(10) Patent No.: US 6,903,478 B2
(45) Date of Patent: Jun. 7, 2005

(54) WINDING FOR ELECTRIC ROTATING MACHINE AND MANUFACTURING METHOD FOR THE SAME

(75) Inventors: Masaomi Dobashi, Kariya (JP); Mitsuru Kato, Anjo (JP); Koji Hayashida, Chiryu (JP); Hiroaki Takeda, Toyota (JP); Yoshinori Nakamura, Okazaki (JP); Yasunori Kitakado, Okazaki (JP); Motohiro Murahashi, Anjo (JP)

(73) Assignee: Denso Corporation, Kariya (JP)

( * ) Notice: Subject to any disclaimer, the term of this patent is extended or adjusted under 35 U.S.C. 154(b) by 129 days.

(21) Appl. No.: 10/387,475

(22) Filed: Mar. 14, 2003

(65) Prior Publication Data

US 2003/0222528 A1 Dec. 4, 2003

(30) Foreign Application Priority Data

Mar. 20, 2002 (JP) ........................................ 2002-077474

(51) Int. Cl.$^7$ ............................. H02K 3/04; H02K 3/50; H02K 15/04
(52) U.S. Cl. ............................. 310/184; 310/42; 310/45; 310/201
(58) Field of Search ............................. 310/42, 45, 180, 310/184, 195, 201

(56) References Cited

U.S. PATENT DOCUMENTS

| | | | |
|---|---|---|---|
| 6,181,043 B1 * | 1/2001 | Kusase et al. | 310/201 |
| 6,339,871 B1 | 1/2002 | Maesoba et al. | 29/596 |
| 6,388,358 B1 | 5/2002 | Umeda et al. | 310/201 |
| 6,459,177 B1 * | 10/2002 | Nakamura et al. | 310/42 |
| 6,501,206 B2 * | 12/2002 | Oohashi et al. | 310/184 |
| 2002/0033649 A1 | 3/2002 | Oohashi et al. | 310/184 |
| 2003/0135980 A1 | 7/2003 | Ichikawa et al. | 29/596 |

FOREIGN PATENT DOCUMENTS

| | | | | |
|---|---|---|---|---|
| EP | 1 005 137 A | 5/2000 | | H02K/3/12 |
| EP | 1 187 299 A | 3/2002 | | H02K/3/50 |
| EP | 1 330 012 A | 7/2003 | | H02K/3/50 |

* cited by examiner

Primary Examiner—Burton Mullins
(74) Attorney, Agent, or Firm—Oliff & Berridge, PLC (57) ABSTRACT

A method for manufacturing a winding for an electric rotating machine includes steps of altering, passing, shaping, and connecting. In the altering step, connecting portions of conductor segments, a part of which is exposed, are altered in shape by a pressing die to provide good contact between the segments when they are connected. The altered segments are passing through slots of a stator core in the passing step. Ends of protruded portions of the segments are shaped so that they make an angle with respect to the radial section of the stator core in the shaping step. Adjacent segments are connected together at ends of the connecting portion in the connecting step.

11 Claims, 6 Drawing Sheets

WINDING FOR ELECTRIC ROTATING MACHINE AND MANUFACTURING METHOD FOR THE SAME

CROSS REFERENCE TO RELATED APPLICATION

This application is based on and incorporates herein by reference Japanese Patent Application No. 2002-77474 filed on Mar. 20, 2002.

FIELD OF THE INVENTION

The present invention relates to winding for an electric rotating machine and its manufacturing method.

BACKGROUND OF THE INVENTION

In recent years, a power generation capacity of a vehicular alternator needs to be improved in response to electrical load increase associate with safety control devices or the like. To meet this requirement, an electric rotating machine having U-shaped electric conductors regularly arranged in slots of a stator to increase a lamination factor of the conductors. By increasing the lamination factor, higher output is obtained from the electric rotating machine. In such an electric rotating machine, insulating layers around ends of the conductors need to be removed prior to a connecting process of the conductors.

Figure 9:
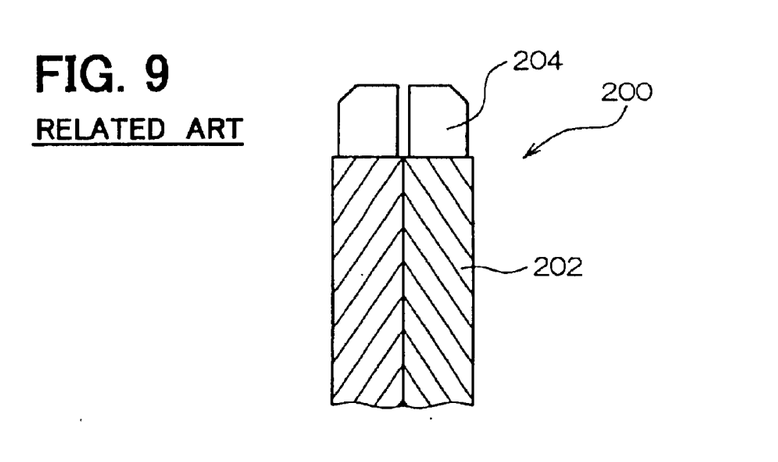
FIG. 9 is a plane view of ends of conductor segments prepared for connection according to a related art.

When placing two conductors adjoining to each other for connection, their bare portions cannot be closely placed because the insulating layers have a certain thickness as shown in FIG. 9. Insulating layers 202 are removed from electric conductors 200 around ends, and bare wires 204 are exposed. When connecting the conductors 200, the bare wires 204 are welded together. However, welding reliability decreases when a distance between the bare wires 204 increases, resulting in a poor connection between the two.

SUMMARY OF THE INVENTION

The present invention therefore has an objective to provide a winding for an electric rotating machine in which connections between conductors are improved while isolation between them is maintained. The winding of the present invention includes a plurality of conductors that pass through slots of a stator core of an electric rotating machine. Each conductor has housed portions housed in the slots and protruded end portions protruded form the slots. The conductors are lined up in each slot in a radial direction of the stator core.

Each protruded end portion has an angled portion for connecting one conductor to another protruded from a different slot. The angled portion is formed so that it extends in a circumferential direction of the stator core at an angle with respect to a radial section of the stator core. The protruded end portion also has an altered portion connecting from the angled portion at one end away from the housed portion.

The altered portions are shaped so that a distance between two conductors decreases toward their ends, and connected together. Therefore, the connection between the two can be easily made and improved while a certain distance appropriate for electrical isolation between the conductors is maintained.

The present invention has another objective to provide a method for manufacturing the above-described winding. The method of the present invention includes steps of passing conductors in slots of a stator core, shaping protruded portions of the conductors, forming a connecting portion, connecting the connecting portion, and altering the connecting portion. In the passing step, the conductors are passing through the slots so that they are lined up in each slot in a radial direction of the stator core.

In the shaping step, protruded portions of the conductors are shaped so that they extend in a circumferential direction of the stator core at an angle with respect to a radial section of the stator core. In the forming step, a connecting portion is formed at an end of each conductor. In the altering step, closely positioned two conductors are connected in the connecting portion. The connecting portion is altered so that a distance between the conductors decreases toward ends.

BRIEF DESCRIPTION OF THE DRAWINGS

The above and other objectives, features and advantages of the present invention will become more apparent from the following detailed description made with reference to the accompanying drawings. In the drawings, the same numerals are used for the same components and devices.

DETAILED DESCRIPTION OF THE PREFERRED EMBODIMENT

The preferred embodiments of the present invention will be explained with reference to the accompanying drawings.

[First Embodiment]

Figure 1:
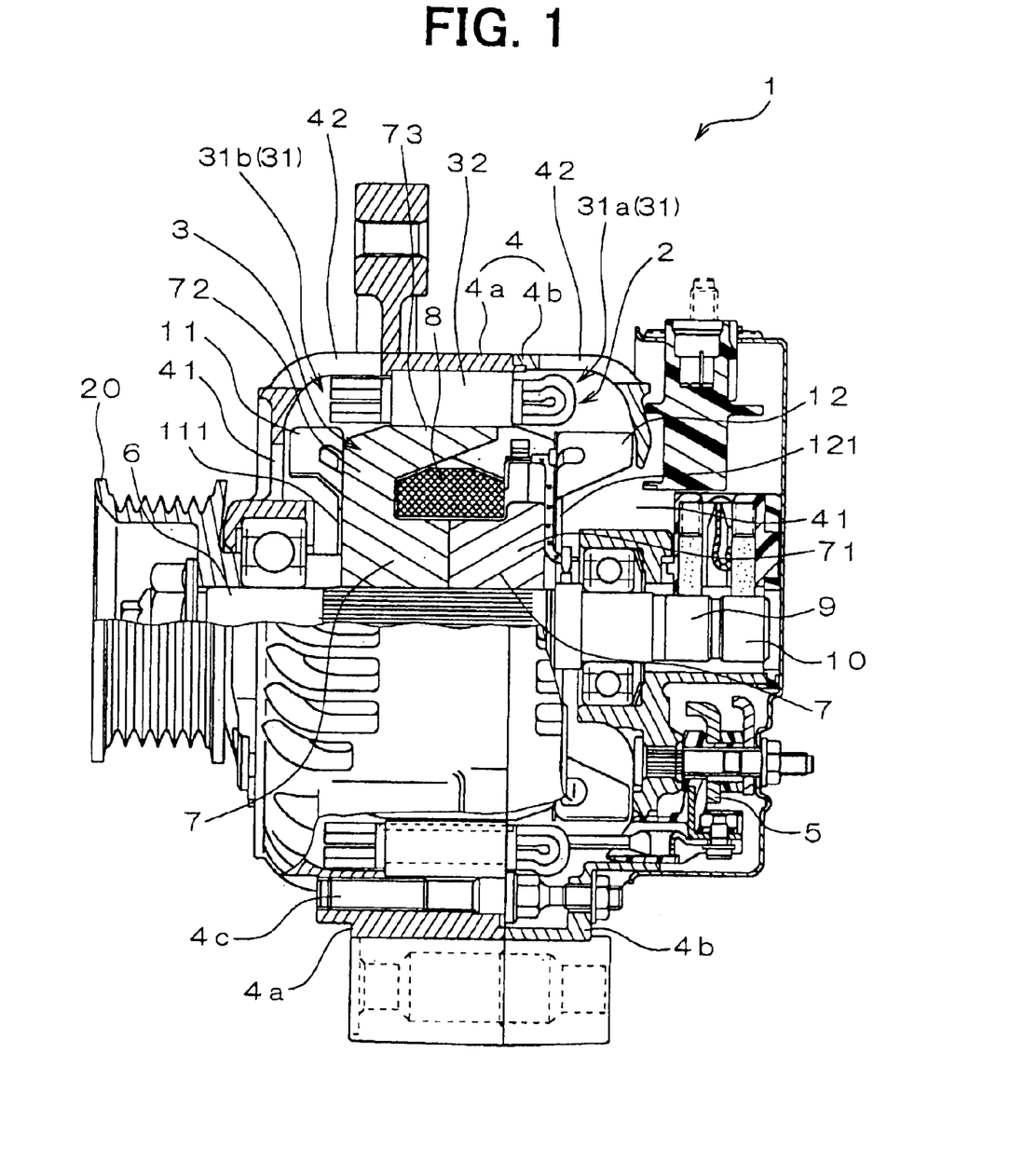
FIG. 1 is a cross-sectional view of a vehicular alternator according to the first embodiment of the present invention.

Referring to FIG. 1, a vehicular alternator 1 includes a stator 2, a rotor 3, a housing 4, and a rectifier 5. The rotor 3, which functions as a field magnet and rotates with a shaft 6, includes a Lundell-type pole core 7, a field coil 8, slip rings 9, 10, a mixed flow fan 11. The rectifier 5 is located away from a pulley 20. The shaft 6 is connected to the pulley 20 and driven by an engine (not shown) installed in a vehicle. The mixed flow fan 11 and a centrifugal fan 12 are air blowing devices.

The Lundell-type pole core 7 is constructed of a pair of pole cores. Each pole core includes a boss 71, a disc 72, and twelve claw poles 73. The boss 71 is assembled to the shaft 6. The disc 72 radially extends from the boss 71. The mixed flow fan 11 on a pulley side has two kinds of blades: one arranged at an acute angle and the other arranged at a right angle with respect to a base plate 111 fixed to an end face of the pole core 7. The centrifugal fan 12 on the other side has blades arranged at a right angle with respect to a base plate 121 fixed to an end face of the pole core 7.

The housing 4 is constructed of a front housing 4a and a rear housing 4b. Air inlet holes 41 are provided on end faces of the front housing 4a and the rear housing 4b, which is parallel to the end face of the pole core 7. Air outlet holes 42 are provided on rounded portions of the front housing 4a and the rear housing 4b. The rectifier 5 rectifies an AC voltage output of the stator 2 to a DC voltage.

The stator 2 is an armature including a stator winding 31 constructed of a plurality of conductor segments 331, 332, a stator core 32 and insulators 34. The stator core 32 has a plurality of slots 35. The insulators 34 are provided for electrical insulation between the winding 31 and the stator core 32.

Figure 2:
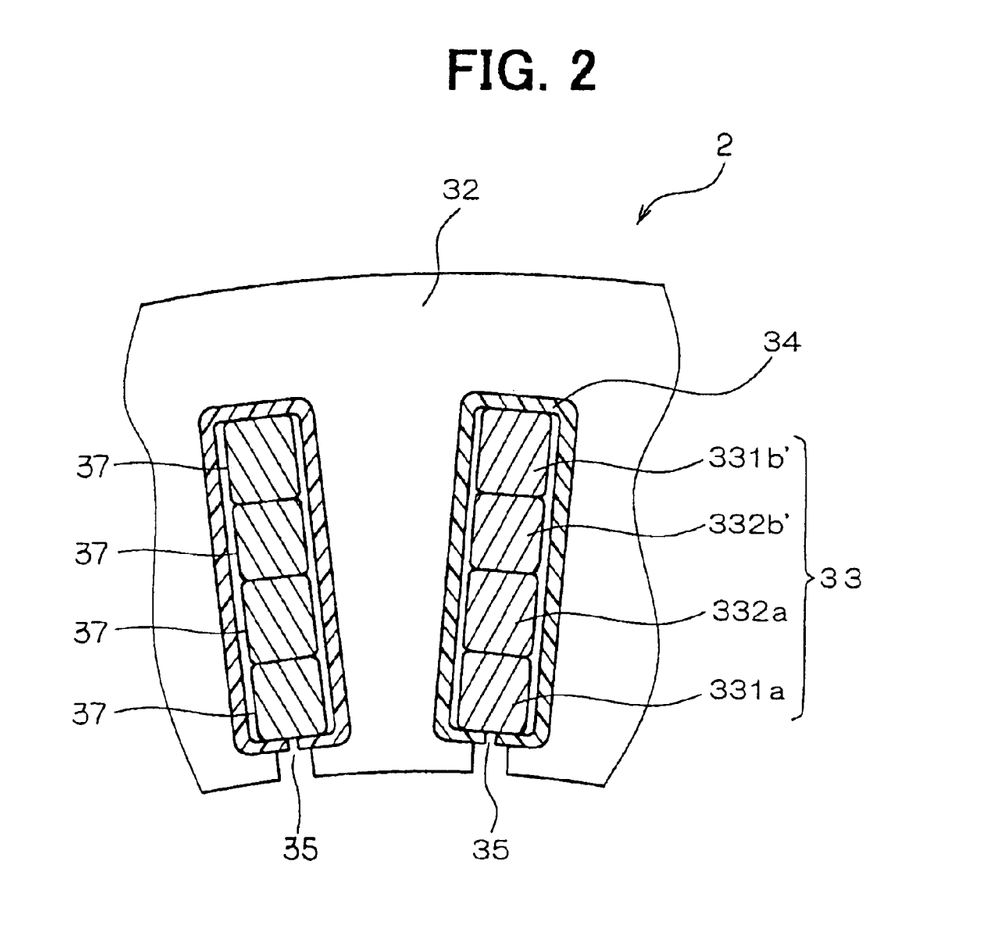
FIG. 2 is a cross-sectional view of a part of a stator core according to the first embodiment.

The winding 31 is a three-phase winding passing through the slots 35. Ninety-six slots 35 are provided at regular intervals in response to the number of poles of the rotor 3. Each slot 35 has an opening on an inner periphery of the stator core 32. When looking at the winding 31 as a set of conductors, each slot holds four conductors as shown in FIG. 2.

The four conductors are lined up in the radial direction of the stator core 32 forming an inner periphery layer, an inner middle layer, an outer middle layer, and an outer periphery layer. The inner periphery layer is located adjacent to the inner periphery of the stator core 32 and the inner middle layer is located next to the inner periphery layer. The outer periphery layer is located adjacent to the outer periphery of the stator core 32 and the outer middle layer is located next to the outer periphery layer.

Each conductor is coated with a layer of insulating material such as polyamide-imide. The winding 31 is constructed by connecting the conductors in predetermined patterns. The first coil ends 31a are connected via connecting members and the second coil ends 31b are connected each other. Each conductor is paired up with another conductor passing through another slot 35 located at a certain pole pitches away. More specifically, a conductor in a certain layer is paired up with another conductor in a different layer in the slot certain pole pitches away.

Figure 3:
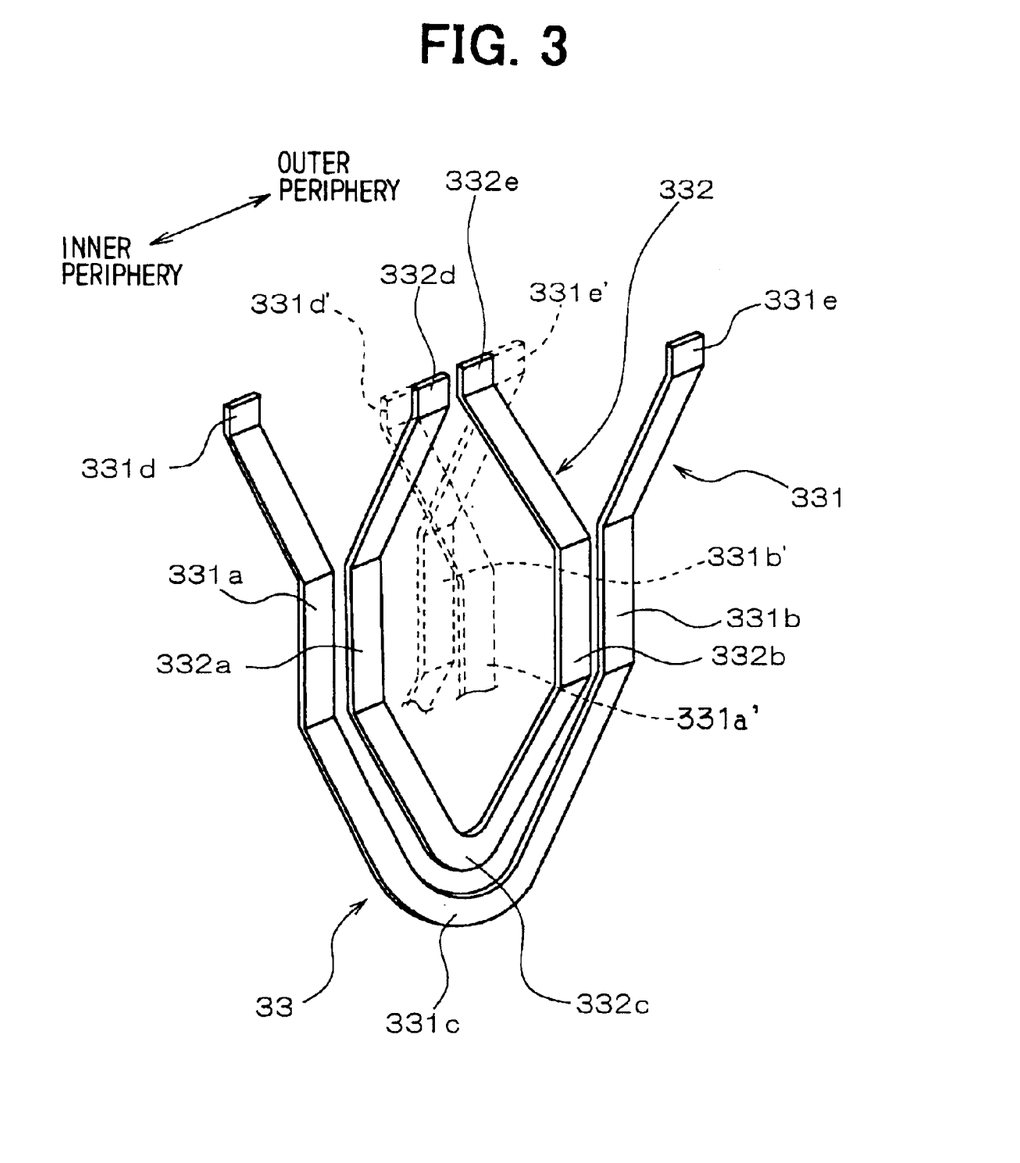
FIG. 3 is a perspective view of conductor segments passing through slots of the stator core.

Referring to FIG. 3, a conductor 331a in the inner periphery layer is paired up with another conductor 331b in the outer periphery layer of a slot one pole pitch away in the clockwise direction. In the same manner, a conductor 332a in the inner middle layer is paired up with another conductor 332b in the outer middle layer of a slot one pole pitch away in the clockwise direction. The paired conductors 331a and 331b, 332a and 332b are connected via connecting members that form turn portions 331c, 332c at the first end located away from the pulley 20.

The turn portion 331c that connects the conductors 331a and 331b together runs over the turn portion 332c that connects the conductors 332a and 332b. The conductors 332a, 332b in the inner and the outer middle layers and their connecting members 332c are covered by the conductors 331a, 331b in the inner and the outer periphery layers and their connecting members 331c. As a result, an inner layer coil end is formed by the conductors 332a, 332b in the inner and the outer middle layers. Moreover, an outer layer coil end is formed by the conductors 331a, 331b in the inner and the outer middle periphery layers.

The conductor 332a in the inner middle layer is also paired up with a conductor 331a' in the inner periphery layer of another slot 35 located one pole pitch away in the clockwise direction. The conductor 331b' in the outer periphery layer is paired up with a conductor 332b in the outer middle layer of another slot 35 located one pole pitch away in the clockwise direction. Ends of the paired conductors 332a and 331a', 331b', and 332b are connected, respectively, at the second end located adjacent to the pulley 20.

At the second end, connecting portions 331d, 331d', 331e, 331e' of the conductors 331a, 331b are bent so that they extend away from each other in the circumferential direction of the stator core 32. Connecting portions 332d, 332e of the conductors 332a, 332b are bent so that they extend close to each other in the circumferential direction of the stator core 32. However, end portion 331g, 332g of the connecting portions 331d, 331d', 331e, 331e', 332d, 332e are maintained perpendicular to a radial section of the stator core 32.

The end portion 331g, 332g of the connecting portions 331d, are bent by more than a distance corresponding to a thickness of the insulating layer 37. By doing so, the ends of the paired conductors come close to each other when they are set for connection. The ends provided for connection have no insulating layers 37 and conductive members are exposed. Adjacent layer coil ends are formed by connecting the conductor 331b in the outer periphery layer to the one 332b in the outer middle layer and the one 331a in the inner periphery layer to the one 332a in the inner middle layer. The connected conductors 331b and 332b, 331a and 332a at the second end are lined up without overlapping in the slots 35.

Furthermore, the conductors 331a, 331b, 332a, 332b are in the form of a U-shaped conductor segment having a substantially rectangular cross-section. The conductors 331a, 331b in the inner periphery layer and the outer periphery layer are provided by a large segment 331, which is one continuous conductor formed in a U-shape. The conductors 332a, 332b in the inner middle layer and the outer middle layer are provided by a small segment 332, which is one continuous conductor formed in a U-shape.

The large segment 331 and the small segment 332 form a base conductor segment 33. The base segments 33 are regularly positioned in the slots 35 to form a coil made from two turns wound on the stator core 32. Although a lead wire of the stator winding 31 and connecting members that connect the first and the second turns are also conductor segments, they are in different shapes from the base segment 33. Six differently shaped conductor segments are used for the lead wire and the connecting members. The connection between the first and the second turns are made by connecting the periphery layers and the middle layers. A differently shaped coil end is formed.

[Second Embodiment]

Figure 7A:
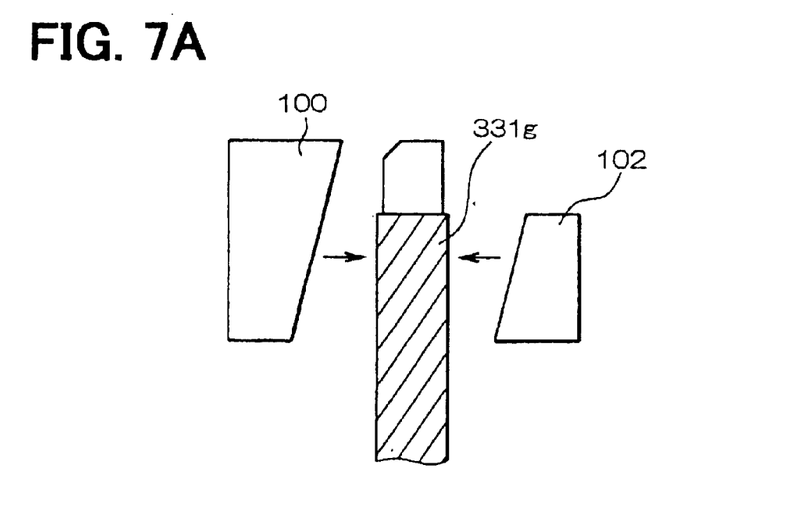
FIG. 7A is a schematic view of one end of a conductor segment and pressing members showing the altering step according to the second embodiment.

Referring to FIG. 7A, a press die is provided for altering shapes of the end portions 331g and 332g of the conductor segments 331 and 332. The press die includes a first die portion 100 and a second die portion 102. One surface of the first die portion 100 and the second die portion 102 are sloped, respectively. The first and the second die portions 100, 102 are set so that the end portion 331g is angled toward one side when the first and the second die portion 100, 102 are pressed against the end portion 331g.

Figure 7B:
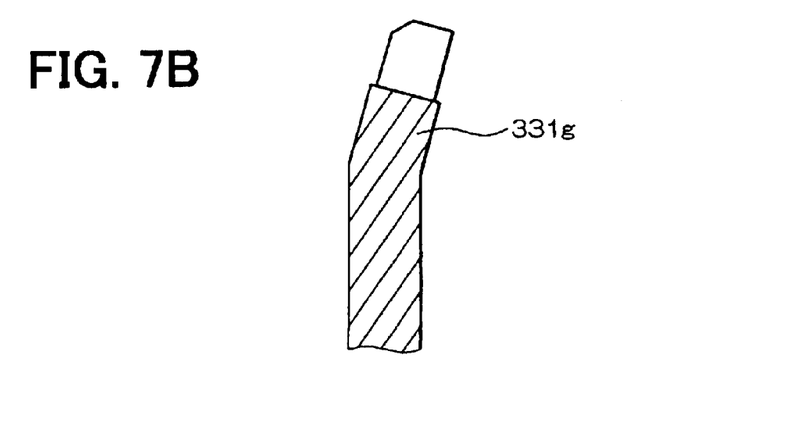
FIG. 7B is a plane view of the end of the conductor segment after the altering step shown in FIG. 7A is performed.

A bare portion 331h is formed at the end of the end portion 331g. An insulating layer is removed from the bare portion 331*h* and a conductive member is exposed. The end portion 331*g* is bent by more than a distance corresponding to a thickness of the insulating layer 37 as shown in FIG. 7B, or a thickness of the removed insulating layer 37. The end portion 332*g* is altered in the same manner. The end portions 331*g* and 332*g* are angled toward each other.

The large segment 331 and the small segment 332 of the base segment 33 are arranged so that the turn portion 323*c* is covered by the turn portion 331*c*. Then, the base segment 33 is passed through the slot 35 from the one end of the stator core 32. One conductor 331*a* of the large segment 331 is passed through the slot 35 on the most inner periphery side to form the inner periphery layer. One conductor 332*a* of the small segment 332 is passed through the slot 35 at a position next to the conductor 331*a*. The other conductor 331*b* of the large segment 331 is passed through the slot 35 that is one pole pitch away in the clockwise direction on the most outer periphery side. The other conductor 332*b* of the small segment 332 is passed through the slot 35 at a position next to the conductor 331*b*.

Figure 4:
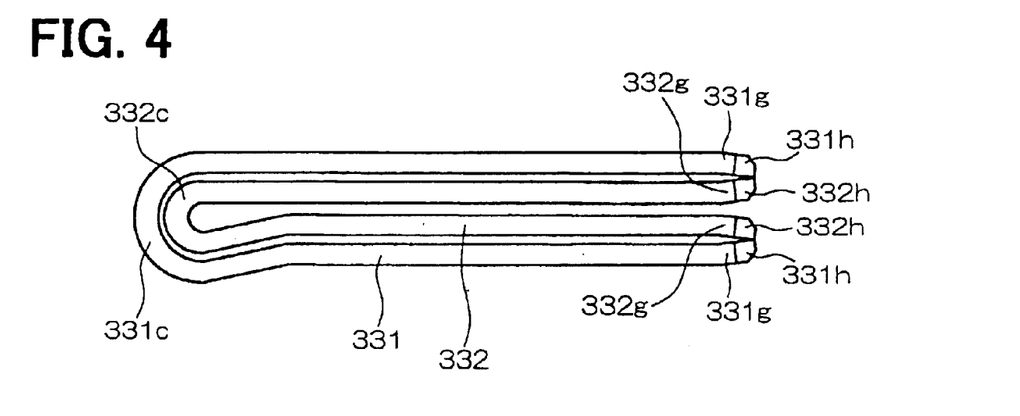
FIG. 4 is a plane view of small and large conductor segments prepared for passing into the slots.
Figure 5:
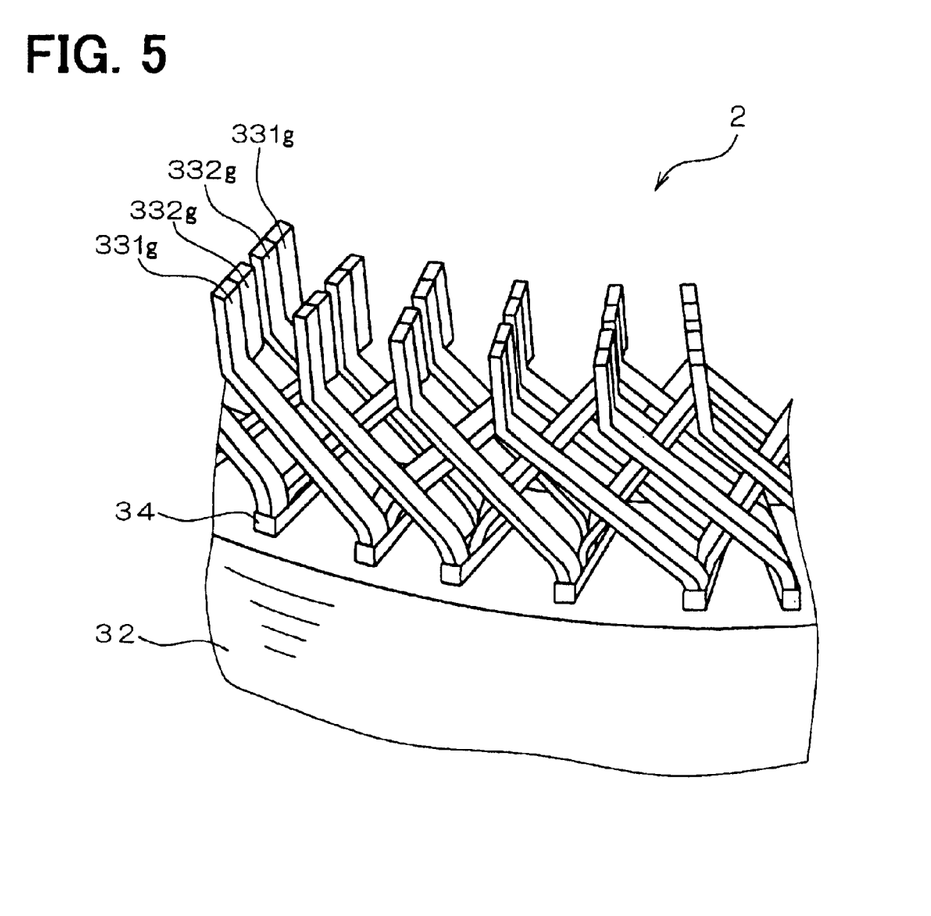
FIG. 5 is a perspective view of a part of a stator showing connection between the conductor segments.
Figure 6:
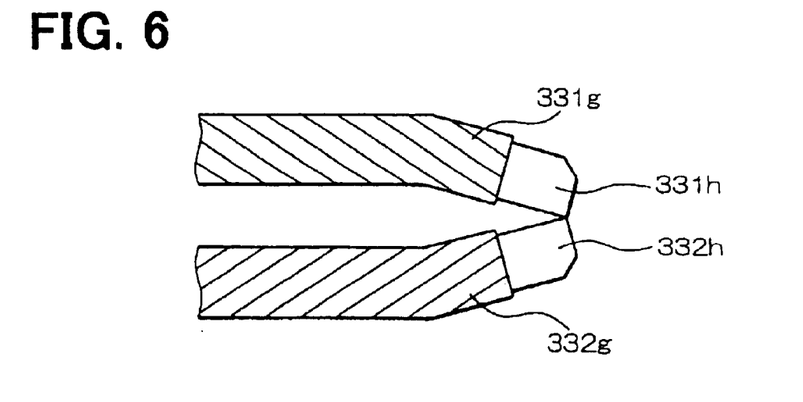
FIG. 6 is a plane view of ends of the conductors segments after an altering step is performed.

The small segment 332 is set inside the large segment 331 as shown in FIG. 4 prior to the above passing step. The large segment 331 and the small segment 332 are passing through respective slots 35 from the end portions 331*g* and 332*g* with this setting. The insulating layer 37 is removed from a part of the end portions 331*g* and 332*g* to provide connecting portions 331*h* and 332*h*. The end portions 331*g* and 332*g* are bent toward each other by pressing so that they have good contact for connection.

After the passing step is completed, straight portions 331*a*, 332*a*, 332*b'*, 331*b'* of the segments 331, 332, which correspond to the conductors, are lined up in the slot 35. The other ends of the segments 331, 332 are located in the slot 35 one pole pitch away.

At the second coil ends 31*b*, ends of the connecting portions 331*d* and 331*e* are held by jigs (not shown), and then the stator core 32 and the jigs are rotated in the opposite directions. As a result, the ends of the connecting portions 331*d* and 331*e* remain perpendicular to a radial section of the stator core 32. The rest of the connecting portions 331*d* and 331*e* are bent in the direction that the large segment 331 stretches out so that the ends are positioned about one and a half slots away from their original positions.

Furthermore, ends of the connecting portions 332*d* and 332*e* are held by jigs (not shown), and then the stator core 32 and the jigs are rotated in the opposite directions. As a result, the ends of the connecting portions 332*d* and 332*e* remain perpendicular to a radial section of the stator core 32. The rest of the connecting portions 332*d* and 332*e* are bent in the direction that the small segment 332 closes in so that the ends are positioned about a half slot away from their original positions.

When the bending step is completed, the conductors adjacently located in the radial direction of the stator core 32 are bent in the opposite circumferential directions. The bending step is performed to all base segments 33 arranged in the slots 35. As a result, all ends of the connecting portions 331*d*, 331*e*, 332*d*, 332*e* are perpendicular to the radial section of the stator core 32. The rest of the connecting portions 331*d*, 331*e*, 332*d*, 332*e* extend in the circumferential directions at an acute angle with respect to the radial section.

Because the end portions 331*g* and 332*g* are angled toward each other, the bare potions 331*h* and 332*h* are brought into contact. The bare portion 331*h* in the outer periphery layer and the bare portion 332*h* in the outer middle layer are electrically connected. The bare portion 332*h* in the inner middle layer and the bare portion 331*h* in the inner periphery layer are electrically connected. The electrical connections are made by welding, such as ultrasonic welding, arc welding and brazing, or by other method.

If the end portions 331*g*, 332*g* of the segments 331, 332 are straight, the bare portions 331*h*, 332*h* have a gap between them due to a thickness of the insulating layer 37 when they are placed together for connection as shown in FIG. 9. Especially, the gap increases when a part of the bare wires is removed in a removing process of the insulating layer 37. In this embodiment, the end portions 331*g*, 332*g* are altered in shape to reduce the gap. Therefore, the bare portions 331*h*, 332 are brought into good contact for connection.

Furthermore, the segments 331, 332 have a substantially rectangular cross-section. Therefore, contacting areas increases. This improves connection between the segments 331, 332.

The step for altering the end portions 331*g*, 332*g* is performed prior to the passing step in this embodiment. However, it can be performed at any point during the manufacturing of the winding 31.

[Third Embodiment]

Figure 8A:
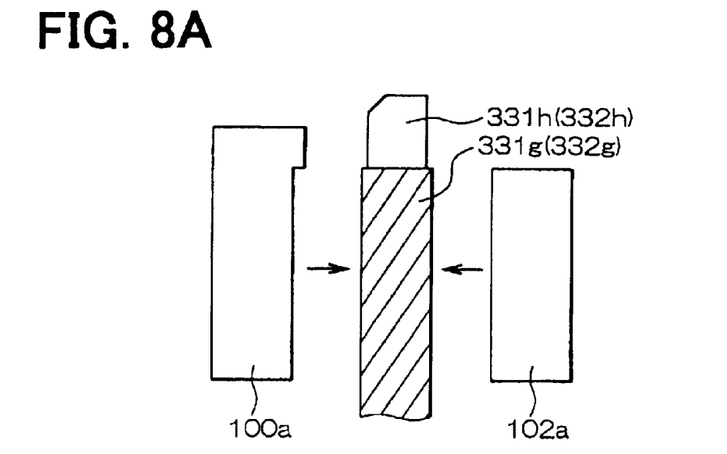
FIG. 8A is a schematic view of one end of a conductor and another pressing members showing an modified alter step according to the third embodiment.

Referring to FIG. 8A, the pressing die has an L-shaped first die portion 100*a* and a prism-shaped second die portion 102*a*. The end portion 331*g* is positioned between the first die portion 100*a* and the second die portion 102*a*. The first and the second die portions 100*a*, 102*a* are set so that the end portion 331*g* is angled toward one side when the first and the second die portion 100*a*, 102*a* are pressed against the end portion 331*g*.

Figure 8B:
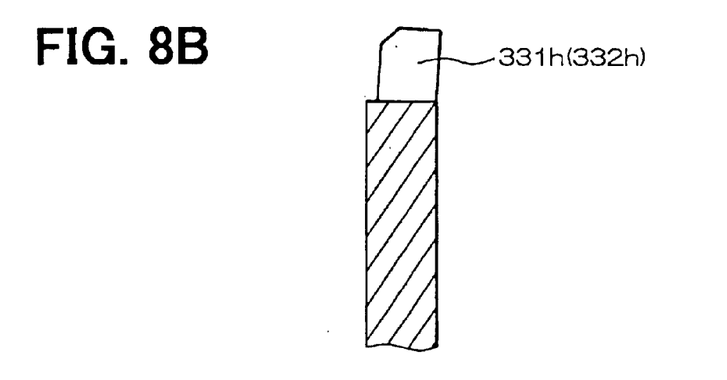
FIG. 8B is a plane view of the end of conductor segment after the altering step shown in FIG. 8A is performed.

The end portions 331*g* and 332*g* are angled toward each other by more than a distance corresponding to a thickness of the insulating layer 37 as shown in FIG. 8B. The end portion 332*g* is altered in the same manner. The end portions 331*g* and 332*g* are angled toward each other.

The present invention should not be limited to the embodiment previously discussed and shown in the figures, but may be implemented in various ways without departing from the spirit of the invention. For example, the winding can be applied to alternators for other than a vehicle. The method is not limited to the manufacturing of a stator winding. It can be applied to manufacturing of other kinds of windings.

What is claimed is:

1. A winding for an electric rotating machine comprising a plurality of conductors passing though slots of a stator core of the electric rotating machine, wherein:

a plurality of conductors are lined up in each slot in a radial direction of the stator core;

each conductor has housed portions housed in the slots and protruded end portions protruded from the stator core;

each protruded end portion has a connecting portion that extends in a circumferential direction of the stator core at an angle with respect to a surface on which openings of the slots are located for connecting with another conductor protruded from a different slot, and an altered portion at an end of the connecting portion; and the altered portion is shaped so that a distance between the connector and the other connector decreases toward ends thereof and is connected with the altered portion of the other connector, wherein the conductor has a substantially uniform cross-sectional area throughout.

2. The winding for an electric rotating machine according to claim 1, wherein:

each conductor is coated with an insulating layer except for a bare portion located at the end of the connecting portion;

the bare portion is connected with the bare portion of the other connector;

the altered portion is shaped such that an end thereof is bent more than a thickness of the insulating layer in the radial director of the stator core.

3. A method for manufacturing a winding of an electric rotating machine, comprising:

passing conductors, coated with insulating layers, through each of a plurality of slots provided in a stator core of the electric rotating machine so that the conductors are lined up in each slot in a radial direction of the stator core and ends of the conductors are protruded from the slots;

shaping protruded portions of the conductors to form a connection portion that extend in a circumferential direction of the stator core at an angle with respect to a radial section of the stator core and adjacent conductors extend in opposite directions;

connecting the connecting portion of conductors in pairs that are closely positioned in the protruded portion shaping step;

altering an end of the connecting portion so that a distance between ends of the connecting portions of the pair decreases toward ends thereof and a cross-section area of the conductors remain substantially uniform throughout.

4. The method according to claim 3, wherein the altering step includes:

shaping the end of the connecting portion so that an end thereof approaches toward a position that the connecting portion of the other conductor is placed; and passing a plurality of conductors having the connecting portions shaped in the shaping step through each slot.

5. The method according to claim 3, wherein:

the insulating layers are removed from ends of the conductors; and the altered step is performed by bending the connecting portion by pressing.

6. The method according to claim 5, wherein the altering step is performed by shaping the connecting portion such that the end thereof is bent more than a thickness of the insulating layers in the radial direction of the stator core.

7. The method according to claim 5, wherein the altering step is performed by shaping the connecting portion such that the end thereof is bent more than a thickness of the removed insulating layers in the radial direction of the stator core.

8. The method according to claim 3, wherein the connectors have substantially rectangular cross-sections.

9. The method according to claim 3, wherein the altering step includes:

placing the connecting portion between a first pressing member and a second pressing member; and applying a force to the first and the second pressing members toward each other to bend the connecting portion.

10. The method according to claim 9, wherein the first pressing member and the second pressing member have a slope on one side, respectively.

11. The method according to claim 9, wherein:

the first pressing member is formed in an L-shape; and the second pressing member is formed in a prism-shape.

* * * * *